US010034143B2

(12) United States Patent
Gatter

(10) Patent No.: US 10,034,143 B2
(45) Date of Patent: Jul. 24, 2018

(54) SYSTEM AND METHOD OF GEO-LOCATING MOBILE APPARATUS

(71) Applicant: Diversey, Inc., Sturtevant, WI (US)

(72) Inventor: Heinz Gatter, Vienna (AT)

(73) Assignee: Diversey, Inc., Sturtevant, WI (US)

( * ) Notice: Subject to any disclaimer, the term of this patent is extended or adjusted under 35 U.S.C. 154(b) by 0 days.

(21) Appl. No.: 15/110,917

(22) PCT Filed: Jan. 9, 2015

(86) PCT No.: PCT/US2015/010882
§ 371 (c)(1),
(2) Date: Jul. 11, 2016

(87) PCT Pub. No.: WO2015/106144
PCT Pub. Date: Jul. 16, 2015

(65) Prior Publication Data
US 2016/0345139 A1 Nov. 24, 2016

Related U.S. Application Data

(60) Provisional application No. 61/925,911, filed on Jan. 10, 2014.

(51) Int. Cl.
*H04W 24/00* (2009.01)
*H04W 4/04* (2009.01)
(Continued)

(52) U.S. Cl.
CPC ............. *H04W 4/04* (2013.01); *H04W 4/021* (2013.01); *H04W 64/006* (2013.01); *A47L 2201/00* (2013.01)

(58) Field of Classification Search
CPC ...... H04W 4/04; H04W 4/021; H04W 64/006
See application file for complete search history.

(56) References Cited

U.S. PATENT DOCUMENTS 7,199,711 B2 4/2007 Field
7,877,166 B2 1/2011 Harwig et al.
(Continued)

FOREIGN PATENT DOCUMENTS

CN 1659602 8/2005
CN 101438326 5/2009
(Continued)

OTHER PUBLICATIONS

International Search Report and Written Opinion, PCT/US2015/010882, dated May 1, 2015.
(Continued)

*Primary Examiner* — William Nealon
(74) *Attorney, Agent, or Firm* — Michael Best & Friedrich LLP

(57) ABSTRACT

A system and method are provided for determining a location of a mobile apparatus. The mobile apparatus can include a chassis, a communications module, and a controller including a processor and memory, wherein the processor is programmed to perform instructions that are stored in the memory. The instructions can include defining an offline perimeter surrounding the chassis, locating a chassis position in relation to the offline perimeter, and determining whether the chassis position is outside the offline perimeter. Upon making this determination, the processor is programmed to establish communication between the mobile apparatus and the central location via the communication module, receive an indication from a network that the chassis is located outside an online perimeter that is larger than the offline perimeter, and output a signal upon receiving the indication.

16 Claims, 5 Drawing Sheets

(51) Int. Cl.
*H04W 4/021* (2018.01)
*H04W 64/00* (2009.01)

(56) References Cited

U.S. PATENT DOCUMENTS

| | | | |
|---|---|---|---|
| 8,002,181 B2 | 8/2011 | Ulrich et al. | |
| 8,018,329 B2 * | 9/2011 | Morgan | B60R 25/04 340/426.18 |
| 8,060,400 B2 | 11/2011 | Wellman | |
| 8,428,778 B2 | 4/2013 | Landry et al. | |
| 8,595,892 B1 | 12/2013 | Everette, Jr. | |
| 8,774,970 B2 | 7/2014 | Knopow et al. | |
| 8,781,626 B2 | 7/2014 | Landry et al. | |
| 2002/0152576 A1 | 10/2002 | Murray et al. | |
| 2005/0171636 A1 | 8/2005 | Tani | |
| 2006/0103523 A1 | 5/2006 | Field | |
| 2006/0293794 A1 | 12/2006 | Harwig et al. | |
| 2007/0176771 A1 * | 8/2007 | Doyle | G08B 13/1427 340/539.13 |
| 2007/0185728 A1 * | 8/2007 | Schwarz | G06Q 10/06 701/36 |
| 2009/0101712 A1 | 4/2009 | Ulrich et al. | |
| 2011/0004342 A1 * | 1/2011 | Knopow | A47L 5/28 700/253 |
| 2011/0148626 A1 * | 6/2011 | Acevedo | G01S 5/0027 340/539.13 |
| 2013/0015962 A1 * | 1/2013 | Dailey | B60R 25/33 340/426.11 |
| 2013/0072226 A1 | 3/2013 | Thramann | |
| 2013/0211589 A1 | 8/2013 | Landry et al. | |
| 2013/0339512 A1 * | 12/2013 | Hjelm | H04W 4/003 709/223 |

FOREIGN PATENT DOCUMENTS

| | | |
|---|---|---|
| CN | 102239710 | 11/2011 |
| EP | 2375791 | 12/2011 |
| JP | H0877471 | 3/1996 |
| JP | 2003065771 | 3/2003 |
| JP | 2011526358 | 10/2011 |

OTHER PUBLICATIONS

International Search Report and Written Opinion, PCT/US2015/010879, dated May 6, 2015.
First Office Action from the State Intellectual Property Office of China for Application No. 201580004301.4 dated Dec. 13, 2017 (19 pages).
EP15735561.1 Extended European Search Report dated Aug. 2, 2017 (12 pages).
Office Action from the Japanese Intellectual Property Office for Application No. 2016-545891 dated May 23, 2018 (14 pages).

* cited by examiner

SYSTEM AND METHOD OF GEO-LOCATING MOBILE APPARATUS

TECHNICAL FIELD

The present invention relates to a system and method of geographically locating a mobile apparatus, such as, but not limited to, a mobile cleaning machine.

BACKGROUND

Mobile cleaning machines, such as floor cleaning machines, are generally known in the art. Many mobile cleaning machines can be commonly divided into two categories: a first category including mobile cleaning machines in which the operator is standing on the floor and walking behind the machine ("walk-behind" machines), and a second category including mobile cleaning machines in which the operator is sitting or standing on the machine itself ("ride-on" machines). Because of the mobility of such machines, it is possible for the machines to be stolen or to go missing. In some geographic locations, up to 20% of mobile cleaning machines go missing annually.

Similar theft and loss issues are common with mobile and portable devices that, for example, are dedicated to a particular facility (e.g., building or other property) but that are susceptible to theft or loss based upon their mobile and portable nature. Examples of such other devices include forklifts, loaders, excavators, scissor lifts, lawnmowers, motorized carts, ATVs, and other wheeled or tracked vehicles.

One solution to the theft and loss issues just described is the use of online geographical location systems. Online geographical location systems utilize online systems such as a global positioning system (GPS), a cellular network, or a radio communication network. GPSs utilize space-based satellites that communicate with a GPS receiver located on the mobile apparatus. The GPS satellites and GPS receiver communicate in order to geographically locate the GPS receiver, and thus the mobile apparatus. In contrast, geographical location systems utilizing cellular networks use the position of a cellular receiver located on the mobile apparatus relative to a plurality of cellular towers. For example, the process of triangulation or trilateration can be used to determine the position of the cellular receiver. Triangulation is the process of determining the location of the cellular receiver by measuring angles between the cellular receiver and two or more cellular towers, whereas trilateration is the process of determining the location of the cellular receiver by measuring the distances between the cellular receiver and two or more cellular towers. Geographical location systems utilizing a radio communication network use similar methods as those used with cellular networks, including but not limited to, triangulation and trilateration.

Online geographical location systems typically require constant online communication. Constant online communication can result in excess drainage of the power source (e.g., the batteries powering the mobile apparatus). Such communication can also utilize communication resources regardless of whether the device being monitored is moving or the extent to which the device has moved. Further, constant online communication can result in excess expenses as a result of data charges.

SUMMARY

It is thus an object of the present invention to provide a system and method for geographically locating a mobile apparatus, such as a cleaning machine in an improved manner, such as by reducing consumption of communications resources, reducing power usage, and/or reducing charges associated with communications performed in the locating process.

In some embodiments, the present invention provides a mobile apparatus operable to communicate with a central location, wherein the mobile apparatus includes a chassis, a communications module, and a controller including a processor and memory, and wherein the processor is programmed to perform instructions stored in the memory. The instructions can include defining an offline perimeter surrounding the chassis, locating a chassis position in relation to the offline perimeter, and determining whether the chassis position is outside the offline perimeter. Upon making this determination, the processor is programmed to establish communication between the mobile apparatus and the central location via the communication module, receive an indication from a network that the chassis is located outside an online perimeter that is larger than the offline perimeter, and output a signal upon receiving the indication, wherein the signal reflects a location of the mobile apparatus outside of the online perimeter.

Some embodiments of the present invention provide a method of geo-locating a mobile apparatus including a chassis, wherein the method includes defining an offline perimeter surrounding the chassis, monitoring the position of the chassis in relation to the offline perimeter, determining whether the chassis is located outside the offline perimeter, and upon this determination, the establishing communication between the mobile apparatus and a central location, defining an online perimeter surrounding the chassis, wherein the online perimeter has a larger area than the offline perimeter, monitoring the position of the chassis in relation to the online perimeter, determining that the chassis is located outside of the online perimeter, and outputting a signal that the chassis is located outside of the online perimeter, wherein the signal indicates a location of the mobile apparatus outside of the online perimeter.

In some embodiments, the present invention provides a geo-location system for determining a location of a mobile apparatus, wherein the system includes a mobile apparatus having a mobile communications module, a central location including a network communications module and a positioning module, and a controller that has a processor and memory. The processor is operable to perform instructions stored in the memory to define an offline perimeter surrounding the mobile apparatus, locate a position of the mobile apparatus in relation to the offline perimeter, and determine whether the position is outside the offline perimeter. Upon the determination, the processor is operable to perform instructions to communicate with the network communications module via the mobile communications module, receive an indication from the central location that the mobile apparatus is located outside an online perimeter that is larger than the offline perimeter, and transmit a signal upon receiving the indication, wherein the signal is an indication of a location of the mobile apparatus outside of the online perimeter.

Other aspects of the present invention will become apparent by consideration of the detailed description and accompanying drawings.

DETAILED DESCRIPTION

Before any embodiments of the present invention are explained in detail, it is to be understood that the invention is not limited in its application to the details of construction and the arrangement of components set forth in the following description or illustrated in the accompanying drawings. The invention is capable of other embodiments and of being practiced or of being carried out in various ways.

Although the invention is described herein in conjunction with a mobile cleaning machine (e.g., a floor scrubbing machine), the invention may apply to any mobile apparatus, including but not limited to a motor vehicle; a semi-truck trailer; a motorized cart; a forklift, excavator, loader, scissor lift, or other construction equipment; an all-terrain vehicle; a boat or other watercraft; a mowing device (e.g., a lawn mower), a dirt and debris pickup device (e.g., a vacuum), other wheeled or tracked vehicles. Some embodiments of the present invention also apply to other portable equipment and devices.

Figure 1:
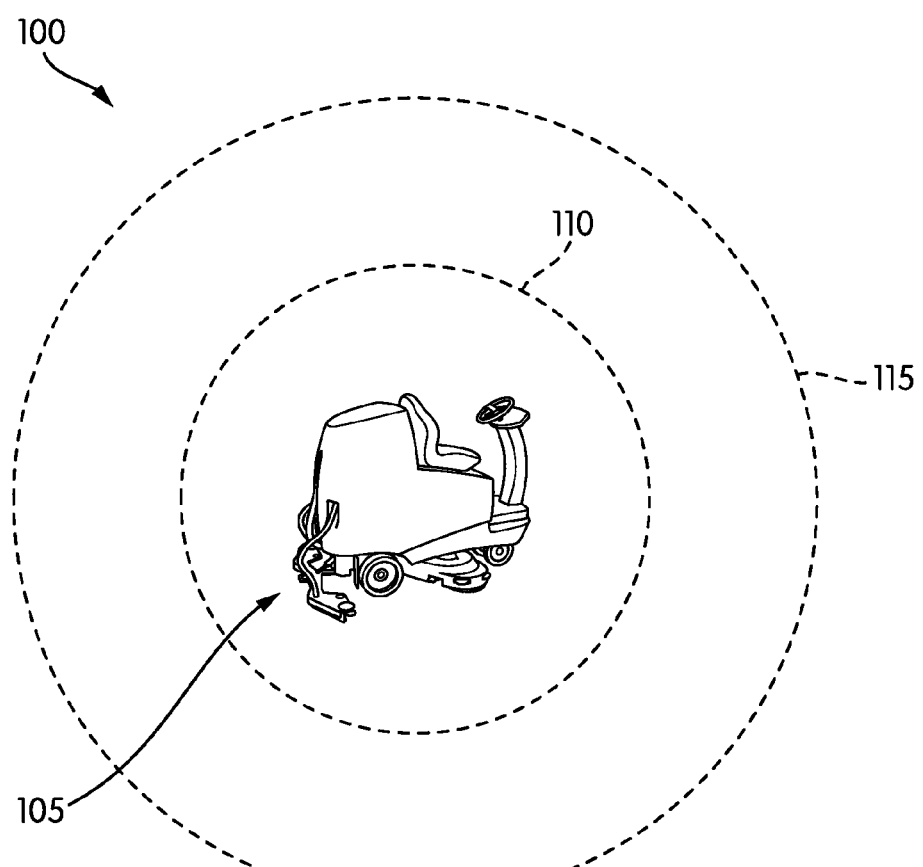
FIG. 1 is a diagram illustrating a geographical location system embodying the invention.
Figure 5:
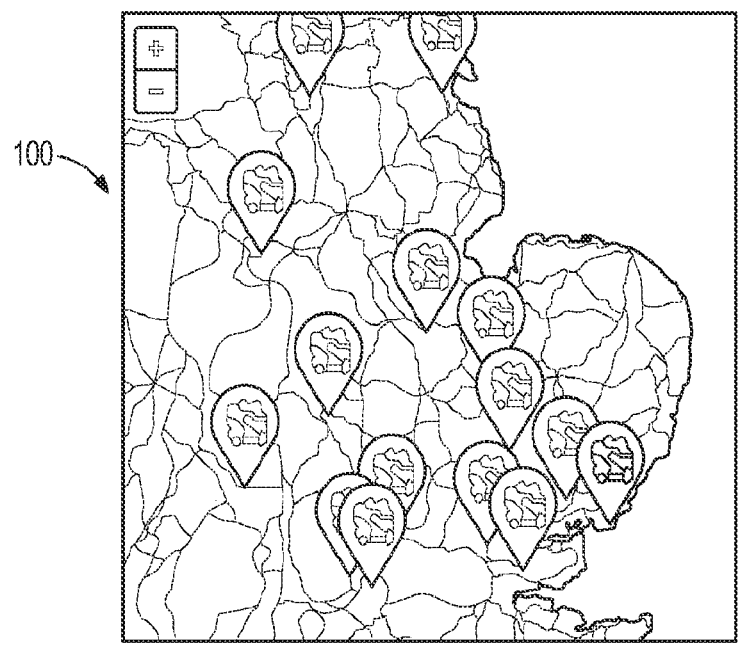
FIG. 5 is a schematic representation of the geographical location system illustrating locations of a plurality of cleaning machines in a region.
Figure 6:
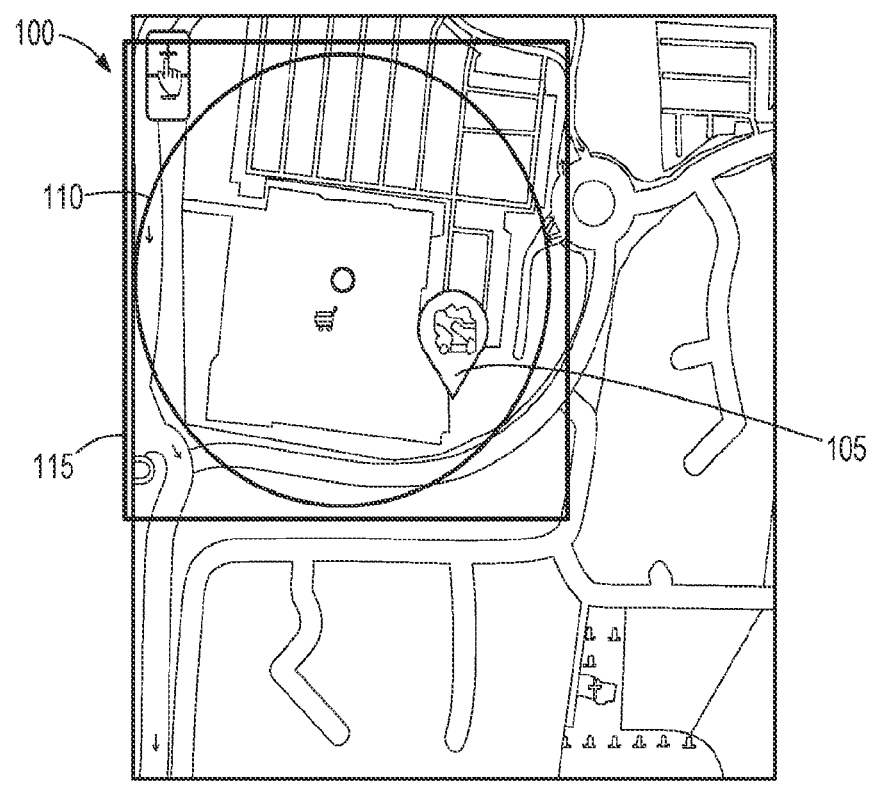
FIG. 6 is a schematic representation of the geographical location control system illustrating an offline geo-fence and an online geo-fence, and a cleaning machine located within the offline geo-fence.

FIGS. 1, 5, and 6 illustrates a geographical location (geo-location) system 100 that can be used in conjunction with, and to geographically locate, a mobile or portable apparatus. As illustrated, the mobile or portable apparatus is a cleaning machine 105, although the geo-location system 100 can track other apparatus. The apparatus 105 will be referred to as a "cleaning machine" or purposes of description.

The geo-location system 100 includes an offline geographical fence 110 (referred to as an "offline geo-fence" for purposes of description) and an online geographical fence 115 (referred to as an "online geo-fence" for purposes of description). The offline geo-fence 110 defines a first perimeter surrounding the cleaning machine 105, and the online geo-fence 115 defines a second, larger perimeter surrounding the cleaning machine 105. As illustrated, the first perimeter is circular and has a first diameter, and the second perimeter is also circular and has a second diameter. The illustrated first diameter of the offline geo-fence 110 is smaller than the second diameter of the online geo-fence 115. Although the offline geo-fence 110 and the online geo-fence 115 are described and illustrated primarily as circular perimeters, with the first perimeter being smaller than the second perimeter, the geo-fences 115 can have perimeters of any regular or irregular shape.

Figure 2:
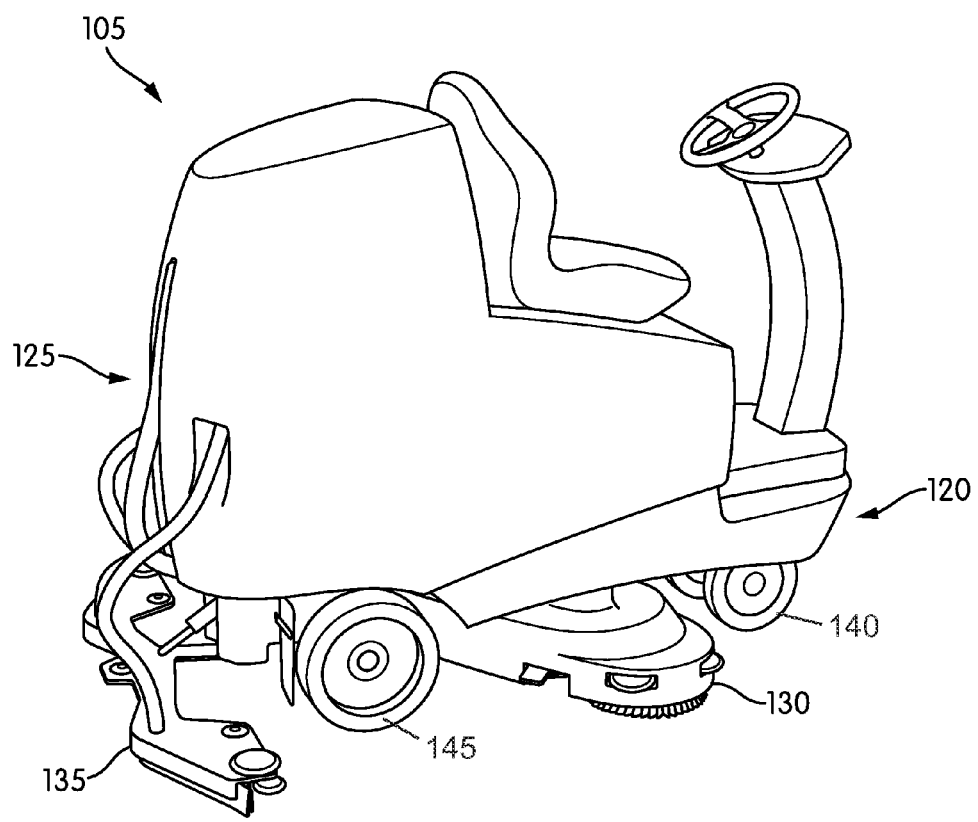
FIG. 2 is a perspective view of a cleaning machine used in conjunction with the geographical location system of FIG. 1.

FIG. 2 illustrates an exemplary mobile cleaning machine 105 that can be used in conjunction with the system 100. As illustrated, the cleaning machine 105 is a "ride-on" floor cleaning machine, although the machine 105 can take the form of a "walk-behind" cleaning machine. The cleaning machine 105 is configured to clean a surface such as a floor and includes, among other things, a frame or chassis 120.

The chassis 120 supports several components of the cleaning machine 105, including but not limited to, a tank 125, a brush unit 130, and a suction element (e.g., a squeegee assembly) 135.

The tank 125 holds a liquid (e.g., cleaning solution including water and a cleaning agent) that is used by the cleaning machine 105 during operation. The brush unit 130 scrubs the surface to agitate and remove dirt or debris. The suction element 135 controls and draws liquid and debris up from the surface.

Figure 3:
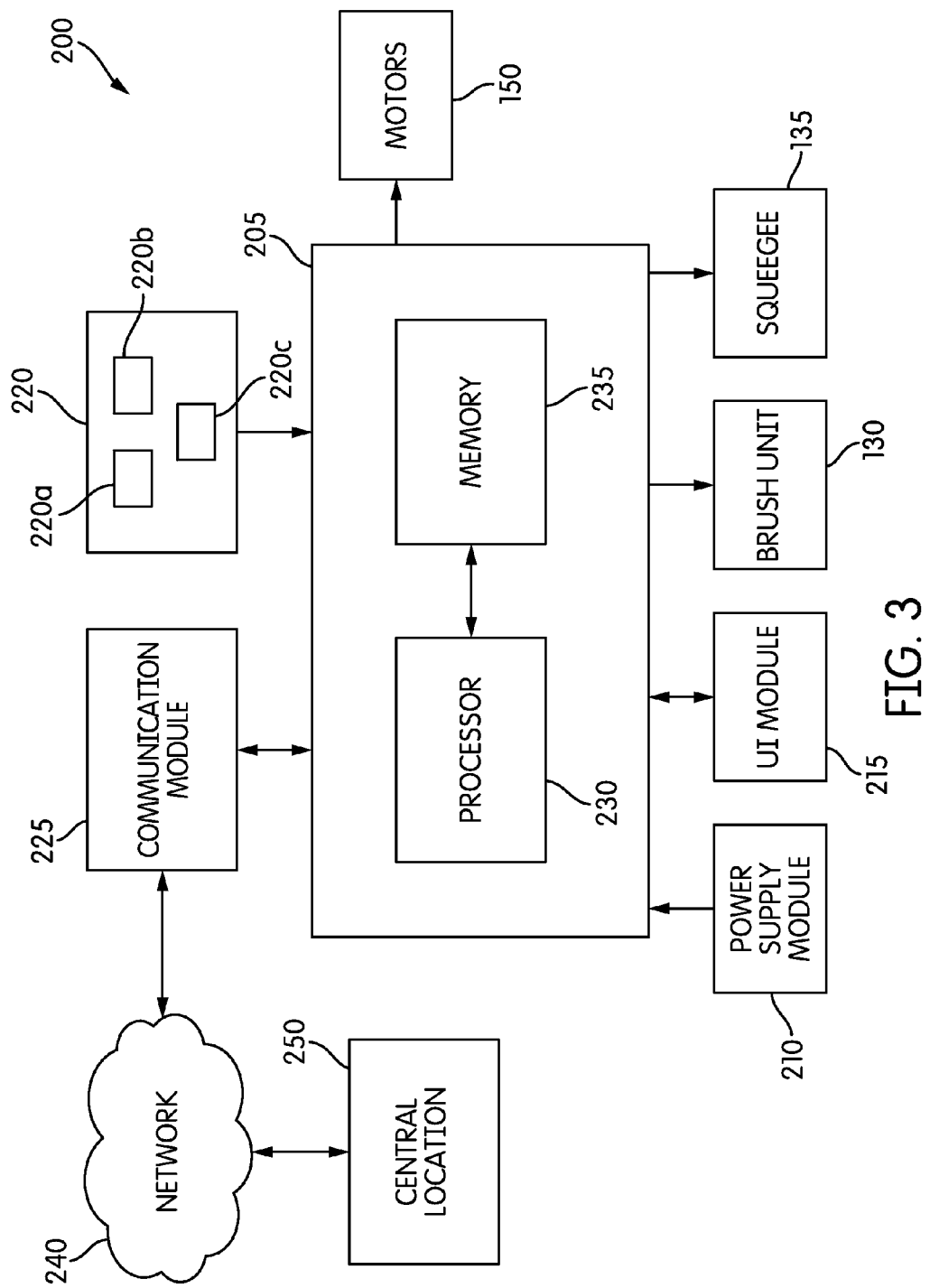
FIG. 3 is a block diagram of a control system of the cleaning machine of FIG. 2.

With continued reference to FIG. 2, the chassis 120 is coupled to and supported by a front castor wheel 140 and one or more rear wheels 145. The illustrated cleaning machine 105 is driven by the rear wheels 145 and is steerable via the front wheel 140, although the machine 105 can be driven with any suitable combination of drive and driven wheels. The wheels 145 are powered by one or more motors 150 (FIG. 3). Although the cleaning machine 105 described and illustrated in the accompanying drawings includes the wheels 140, 145 for movement of the cleaning machine 105 over a surface, it will be appreciated that other types of devices can be used to move the cleaning machine 105. These other types of devices can include, for example, powered or un-powered tracks. For the sake of simplicity, the term "wheel" as used herein and in the appended claims refers to any and all such moving elements.

FIG. 3 illustrates a block diagram of a control system 200 associated with the cleaning machine 105 of FIG. 2. The control system 200 includes a controller 205 that is electrically and/or communicatively connected to a variety of modules or components of the cleaning machine 105. For example, the illustrated controller 205 is connected to motors 150 of the cleaning machine 105 (for driving wheels of the cleaning machine 105, one or more pumps for moving fluid within the cleaning machine 105, and the like), a power supply module 210, a user interface module 215, one or more sensors 220, and a communications module 225. Each of the motors 150, the power supply module 210, the user interface module 215, the sensors 220, and the communications module 225 is supported upon and coupled to the cleaning machine 105.

The controller 205 can include any suitable combination of hardware and software that is operable to, among other things, control the operation of the cleaning machine 105. The exemplary controller 205 includes a plurality of electrical and electronic components that provide power, operational control and, in some cases, protection to the components and modules within the controller 205 and/or the cleaning machine 105. For example, the controller 205 can include, among other things, a processing unit 230 (e.g., a microprocessor, a microcontroller, or another suitable programmable device) and a memory 235, and in some embodiments can be implemented partially or entirely on a semiconductor (e.g., a field-programmable gate array ("FPGA")) chip, such as a chip developed through a register transfer level ("RTL") design process.

The memory 235 can include, for example, a program storage area and a data storage area. The program storage area and the data storage area can include one or more different types of memory, such as read-only memory ("ROM"), random access memory ("RAM") (e.g., dynamic RAM ("DRAM"), synchronous DRAM ("SDRAM"), etc.), electrically erasable programmable read-only memory ("EEPROM"), flash memory, a hard disk, an SD card, or other suitable magnetic, optical, physical, or electronic memory device. The processing unit 230 can be connected to the memory 235 for execution of software instructions that are capable of being stored in a RAM of the memory 235 (e.g., during execution), a ROM of the memory 235 (e.g., on a more permanent basis), or another non-transitory computer readable medium such as another memory or a disc. Software included in some implementations of the cleaning machine 105 can be stored in the memory 235 of the controller 205, and can include, for example, firmware, one or more applications, program data, filters, rules, one or more program modules, and other executable instructions. In some embodiments, the controller 205 is configured to retrieve from memory and execute, among other things, instructions related to the control processes and methods described herein. As will be appreciated, the controller 205 can include additional, fewer, or different components.

The illustrated power supply module 210 supplies a nominal voltage to the controller 205 and other components or modules of the cleaning machine 105. More specifically, the illustrated power supply module 210 receives DC power from one or more batteries or battery packs (not shown), and outputs the nominal voltage to the controller 205 and the other components or modules of the cleaning machine 105. The power supply module 210 can receive power from other grid-independent power sources (e.g., a generator, a solar panel, etc.) in some cases, or an AC voltage from which the nominal voltage is output to the controller 205 and the other components or modules of the cleaning machine 105.

In some embodiments, the power supply module 210 receives power from the cleaning machine 105 when the machine 105 is in operation and supplies the nominal voltage to the components and modules of the cleaning machines 105. In these embodiments, one or more batteries or battery packs can be charged (e.g., using a high-speed charger) during operation of the cleaning machine 105. When the cleaning machine 105 is not in operation, the power supply module 210 does not supply the nominal voltage to the components and modules of the cleaning machine 105. Instead, the power supply module 210 receives power from the batteries or a battery pack and supplies the nominal voltage to the control system 200 (and possibly other components and modules of the machine 105).

The user interface module 215 is used to control or monitor aspects of the cleaning machine 105. For example, the user interface module 215 of the illustrated embodiment is operably coupled to the controller 205 to control operation of the cleaning machine 105, and can include a combination of digital and analog input or output devices required to achieve a desired level of control and monitoring for the cleaning machine 105. For example, the user interface module 215 includes a display (e.g., a primary display, a secondary display, etc.) and input devices (e.g., a touch-screen display, a plurality of knobs, dials, switches, buttons, etc.). The display can be, for example, a liquid crystal display ("LCD"), a light-emitting diode ("LED") display, an organic LED ("OLED") display, an electroluminescent display ("ELD"), a surface-conduction electron-emitter display ("SED"), a field emission display ("FED"), a thin-film transistor ("TFT") LCD, or a reflective bistable cholesteric display (i.e., e-paper). The user interface module 215 also can be configured to display conditions or data associated with the cleaning machine 105 in real-time or substantially real-time. For example, the user interface module 215 can be configured to display the status of the cleaning machine 105, the position and operational status (e.g., rotating or stationary, speed, etc.) of the brush unit 130, a fluid level of the tank 125, and the like.

With continued reference to the illustrated embodiment, the sensors 220 include accelerometers 220a, position sensors 220b, and fluid level sensors 220c. The accelerometers 220a can sense acceleration of the cleaning machine 105 in a variety of directions (e.g., an x-direction, a y-direction, a z-direction, and the like). The position sensors 220b can sense the position of the cleaning machine 105 or the position of various components of the cleaning machine 105, such as the position of the cleaning machine 105 relative to a fixed object (e.g., a wall), or the position of the brush unit 130 and/or the suction element 135 relative to the chassis 120 and/or the floor, or the speed of the cleaning machine 105 or rotational speed of the brushes. In one non-limiting example, the level sensors 220c sense a measurement of the fluid contained in the tank 125. In another example, the level sensors 220 measure an angular position of the cleaning machine 105 relative to a vertical axis. Fewer or more sensors 220 can be provided on the machine 105 as desired.

The illustrated communications module 225 is configured to connect to and communicate with other devices (e.g., a computer, another cleaning machine, etc.) through a network 240. The network 240 can be, for example, a wide area network ("WAN") (e.g., a global positioning system ("GPS"), a TCP/IP based network, a cellular network, such as, for example, a Global System for Mobile Communications ("GSM") network, a General Packet Radio Service ("GPRS") network, a Code Division Multiple Access ("CDMA") network, an Evolution-Data Optimized ("EV-DO") network, an Enhanced Data Rates for GSM Evolution ("EDGE") network, a 3GSM network, a 4GSM network, a Digital Enhanced Cordless Telecommunications ("DECT") network, a Digital AMPS ("IS-136/TDMA") network, or an Integrated Digital Enhanced Network ("iDEN") network, etc.).

The network 240 can be a local area network ("LAN"), a neighborhood area network ("NAN"), a home area network ("HAN"), or personal area network ("PAN") employing any of a variety of communications protocols, such as Wi-Fi, Bluetooth, ZigBee, etc. Communications through the network 240 by the communications module 225 or the controller 205 can be protected using one or more encryption techniques, such as those techniques provided in the IEEE 802.1 standard for port-based network security, pre-shared key, Extensible Authentication Protocol ("EAP"), Wired Equivalency Privacy ("WEP"), Temporal Key Integrity Protocol ("TKIP"), Wi-Fi Protected Access ("WPA"), and the like.

The connections between the communications module 225 and the network 240 are, for example, wired connections, wireless connections, or any combination of wireless and wired connections. Similarly, the connections between the controller 205 and the network 240 or the network communications module 225 are wired connections, wireless connections, or any combination of wireless and wired connections. In some embodiments, the controller 205 or communications module 225 includes one or more communications ports (e.g., Ethernet, serial advanced technology attachment ("SATA"), universal serial bus ("USB"), integrated drive electronics ("IDE"), CAN bus, etc.) for transferring, receiving, or storing data associated with the cleaning machine 105 or the operation of the cleaning machine 105.

The communications module 225 communicates, through the network 240, with a central location or central control station 250 (referred to as the "central location" for ease of description). The central location 250 can be one or a combination of a centrally located computer, a network of computers, and one or more centrally located servers, and functions to store, interpret, and communicate data from one or more cleaning machines 105. For example, the central location 250 can receive data from the cleaning machine 105 through the network 240, interpret the received data, and communicate the interpreted data to a user.

During normal operation, the controller 205 can be disconnected from the central location 250. Disconnection from the central location 250 can significantly preserve battery power. Therefore, when applicable, it may be desirable to disconnect the cleaning machine 105 from the central location 250.

In some constructions, the controller 205 can connect with the central location 250 periodically at least to communicate machine usage data to the central location 250. In some exemplary embodiments, the controller 205 attempts connection with the central location 250 at predetermined time periods (e.g., every one minute, every five minutes, every ten minutes, etc.). After the controller 205 successfully connects with the central location 250 (when the machine 105 is in operation or not in operation), the communications module 225 can send a message to the central location 250 through the network 240 requesting geographical positioning information, and the online geo-fence 115 is activated. The controller 205 may fail to connect with the central location 250 for a variety of reasons, such as but not limited to the cleaning machine 105 being positioned 1) within the offline geo-fence 110; 2) in an out-of-network area; or 3) in an area where connection to the central location 250 is impossible.

When disconnected from the central location 250, the controller 205 defines the offline geo-fence 110 surrounding the cleaning machine 105. In some embodiments, the offline geo-fence 110 is defined using information from the sensors 220 along with a plurality of mathematical functions. After the offline geo-fence 110 is defined, the controller 205, along with the sensors 220, continually tracks the location of the cleaning machine 105 in relation to the offline geo-fence 110. If the cleaning machine 105 exits the offline geo-fence 110, the controller 205 automatically establishes (or re-establishes) communication with the central location 250.

When the communication link between the controller 205 and central location 250 has been enabled, the central location 250 geographically locates the cleaning machine 105 and can define the online geo-fence 115 around the cleaning machine 105. Thereafter, the central location 250 can continually track the location of the cleaning machine 105 relative to the online geo-fence 115. The location of the cleaning machine 105 can be tracked using one of the methods discussed above (e.g., GPS, utilization of a cellular network, utilization of a radio network, etc.). If the cleaning machine 105 exits the online geo-fence 115, the central location 250 can output a signal, indication, alert, or other communication (referred to as a "signal" for descriptive purposes) to one or more users that the cleaning machine 105 has exited the online geo-fence 115. The signal to one or more users can take the form of one or more of an e-mail, a text message, a phone call, and other digital messages.

The signal can also or instead be communicated to the cleaning machine 105. Upon receiving a signal from the central location 250, the cleaning machine 105 can deactivate completely, or partially deactivate while still providing geographical location information to the central location 250. For example, the location information can be communicated to the central location 250 via the user interface module 215.

Figure 4:
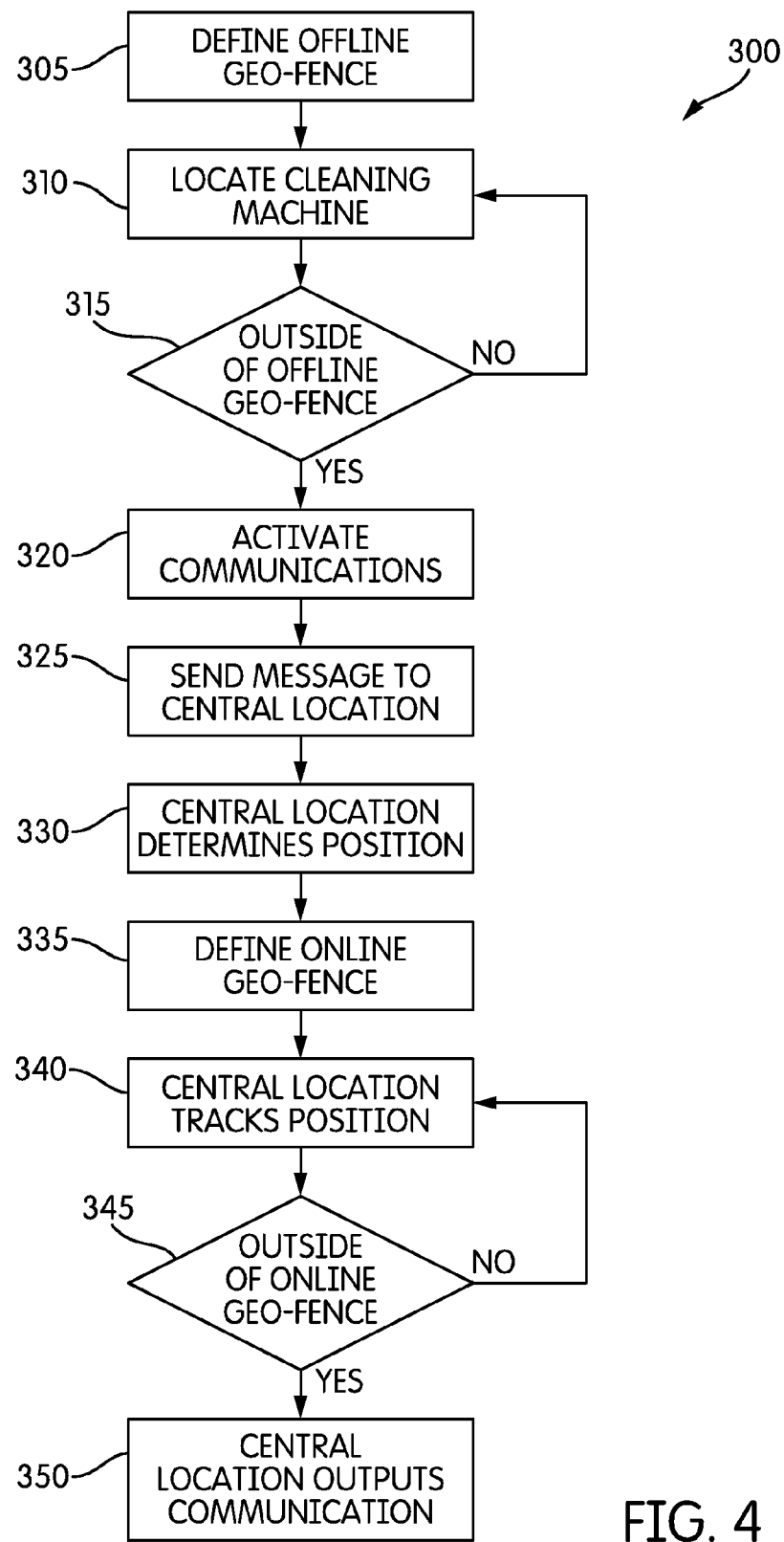
FIG. 4 is a flow chart illustrating operation of the control system of FIG. 3.

FIG. 4 is a flowchart illustrating an exemplary process 300 of geographically locating the cleaning machine 105. It will be appreciated that steps in the process 300 can differ or vary from what is described below and illustrated in the figures while remaining consistent with a system that can track the location of an apparatus.

With reference to FIGS. 4 and 6, the controller 205 defines an offline geo-fence 110 around the cleaning machine 105 at Step 305 (or alternatively, an offline geo-fence is at least partially defined by an individual setting up or configuring the cleaning machine at a facility or other location, such as by inputting a perimeter of the offline geo-fence into the memory 235 of the controller 205 via the UI module 215). At step 310, the controller 205 determines the location of the cleaning machine 105 in relation to the offline geo-fence 110 at Step 310. The controller 205 determines whether the location of the cleaning machine 105 is inside the offline geo-fence 110 at Step 315. If the cleaning machine 105 is inside the offline geo-fence 110, the process 300 proceeds back to Step 315.

If the cleaning machine 105 is not inside the offline geo-fence 110 (i.e. the machine 105 is outside the offline geo-fence 110), the controller 205 activates the communications module 225 at Step 320. At Step 325, the controller 205 sends a message to the central location 250 through the network 240 requesting geographical position information for the machine 105. The central location 250 determines a position of the cleaning machine 105 at Step 330 and, at Step 335, the central location 250 defines an online geo-fence 115 around the cleaning machine 105 based on preset information. For example, the online geo-fence 115 can be predefined based on the location of the cleaning machine 105 in relation to one or more cell towers (e.g., defining a cell location or cell ID of the cleaning machine 105) or based on one or more distances from a predefined central point. In the cell tower example, a cellular or other signal can be used to ping or locate the cleaning machine 105 relative to the online geo-fence 115. If the cell location or cell ID changes, the system can determine that the cleaning machine has moved outside the online geo-fence 115. The online geo-fence 115 can be defined using only a cell location or cell ID associated with the cell tower, or based on a distance from the cell tower (e.g., within a predefined distance from the cell tower).

When the online geo-fence 115 is defined by one or more predefined distances relative to a cell tower or another central point, the geo-fence 115 can be defined by a radial distance from the central point. Other exemplary online geo-fences 115 can be defined by polygonal shapes or non-uniform distances relative to the central point. Although the offline geo-fence 110 is illustrated as circular in FIGS. 1 and 6, and the online geo-fence 115 is illustrated as circular or square in FIGS. 1 and 6 respectively, it will be appreciated that the offline geo-fence 110 and the online geo-fence 115 can have any size and shape. The offline geo-fence 110 and the online geo-fence 115 can have the same shape (e.g., concentric shapes) or different shapes (e.g., a round or circular offline geo-fence 110 and a trapezoidal online geo-fence 115, etc.). In addition, the center of the offline geo-fence 110 and the online geo-fence 115 can share a common central point or have different central points.

The central location 250 tracks the position of the cleaning machine 105 at Step 340 and, at Step 345, the central location 250 determines whether the cleaning machine 105 is within the online geo-fence 115. If the cleaning machine 105 is within the online geo-fence 315, the process 300 proceeds to Step 340 and continues to track the position of the cleaning machine 105. If the cleaning machine 105 is not within the online geo-fence 115 (i.e. the machine 105 is outside the online geo-fence 115), the central location 250 outputs a signal at Step 350. For example, the signal can be or include an indicator of the location of the cleaning machine 105.

When the offline geo-fence 110 is defined by the perimeter of a building, for example, the controller 205 activates the communications module 225 upon the cleaning machine 105 leaving the building. Upon activation, the communications module 225 sends a message to the central location 250 through the network 240 requesting geographical positioning information. The online geo-fence 115 also is activated.

The geo-location system 100 defines a perimeter or area in which a cleaning machine can be used, and triggers a notification when the machine 105 is outside the perimeter. The overall perimeter is defined by the offline geo-fence 110 that encompasses a first area, and the online geo-fence 115 that encompasses a second, larger area. In some embodiments, the first area is defined by mathematical function (e.g., a polygon) and acts as a sub-fence within the larger, second fenced area. The offline geo-fence 110 works off the machine 105 and knowledge of the specific location of the machine 105. That is, when the machine 105 is in the first area, no machine location data is or need be communicated between the machine 105 and the central location 250. Instead, data need only be sent when the machine 105 leaves the first area.

The illustrated system 100 activates the online geo-fence 115 after the machine 105 leaves the first area defined by the offline geo-fence 110, and then actively monitors (e.g., continuously or at predetermined intervals) the machine's location. The system can notify the central location 250 or appropriate personnel when the machine 105 is located outside the offline geo-fence 110, when the machine 105 is outside the online geo-fence 115, or both. In some circumstances, the system can deactivate the machine 105 after the machine has left the first area, the second area, or both so that loss of the asset (i.e. the machine 105) can be avoided.

With the geo-location system 100, the need to transmit data through a third-party communications system, such as a GPS, cellular network, and the like, only exists when the machine 105 is located outside the offline geo-fence, which in some cases can be set so that any movement of the machine 105 outside of the offline geo-fence is (or is most likely) unauthorized. Until that point, communication is not required between the machine 105 and the central location 250 regarding the location of the machine 105. Even if location data communication is provided, (e.g., when the central location 250 is owned and/or controlled by personnel located within the perimeter defined by the offline geo-fence 110), the need and expense associated with a third-party communications system would only exist if, for example, the machine is stolen or otherwise moved from the within the offline geo-fence 110 without authorization.

The illustrated online geo-fence 115 encompasses and is larger than the offline geo-fence 110, although the offline and online geo-fences 110, 115 can coincide and have the same or substantially the same perimeter. In other words, the offline and online geo-fences 110, 115 can be the same. In such cases, as soon as movement of the machine outside of the offline geo-fence 110 is detected, the online geo-fence 115 is activated, and actively monitors (e.g., continuously or at predetermined intervals) the machine's location while also sending a signal to indicate that the machine 105 has left the online geo-fence 115 and/or automatically triggering deactivation of the machine 105. In such embodiments, movement of the machine 105 through a larger online geo-fence is not required before provide notification to appropriate personnel and/or authorities that the machine 105 has been moved outside of an acceptable area (e.g., a facility or other property boundary).

Various features and advantages of the invention are set forth in the following claims.

The invention claimed is:

1. A mobile apparatus operable to communicate with a central location, the mobile apparatus comprising:
   a chassis;
   a communications module; and
   a controller including a processor and memory, the processor programmed to perform instructions stored in the memory, the instructions including
      defining an offline perimeter surrounding the chassis, wherein the offline perimeter is defined when the mobile apparatus is disconnected from the central location,
      locating a chassis position in relation to the offline perimeter,
      determining whether the chassis position is outside the offline perimeter, and upon the determination,
         establishing communication between the mobile apparatus and the central location over a network via the communication module and defining an online perimeter around the chassis after establishing communication to enable tracking of the chassis relative to the online perimeter, the online perimeter having a larger area than the offline perimeter,
         receiving an indication via the network that the chassis is located outside the online perimeter, and
         transmitting a signal reflecting a location of the mobile apparatus outside of the online perimeter upon receiving the indication.

2. The mobile apparatus of claim 1, wherein the offline perimeter is defined by a mathematical function.

3. The mobile apparatus of claim 2, wherein the online perimeter is defined by one of a global positioning system, a cellular network, and a radio communication network.

4. The mobile apparatus of claim 1, wherein the signal is a notification that the chassis is located outside the online perimeter.

5. The mobile apparatus of claim 1, wherein the signal deactivates the mobile apparatus.

6. The mobile apparatus of claim 1, wherein the mobile apparatus is a floor cleaning machine.

7. A method of geo-locating a mobile apparatus including a chassis, the method comprising:
   defining an offline perimeter surrounding the chassis, wherein the offline perimeter is defined when the mobile apparatus is disconnected from a central location;
   monitoring the position of the chassis in relation to the offline perimeter;
   determining that the chassis is located outside the offline perimeter, and upon the determination,
      establishing communication between the mobile apparatus and the central location over a network and defining an online perimeter surrounding the chassis to enable tracking of the chassis relative to the online perimeter, the online perimeter having a larger area than the offline perimeter,
      monitoring the position of the chassis in relation to the online perimeter, determining that the chassis is located outside of the online perimeter, and transmitting a signal that the chassis is located outside of the online perimeter, wherein the signal indicates a location of the mobile apparatus outside of the online perimeter.

8. The method of claim 7, wherein the offline perimeter is defined by a mathematical function.

9. The method of claim 7, wherein the online perimeter is defined by one of a global positioning system, a cellular network, and a radio communication network.

10. The method of claim 7, further comprising notifying one or both of a server and an end user that the chassis is located outside the online perimeter.

11. The method of claim 7, further comprising deactivating the mobile apparatus based upon determining that the chassis is located outside of the online perimeter.

12. A geo-location system for determining a location of a mobile apparatus, the system comprising:
- a mobile apparatus having a mobile communications module;
- a central location including a network communications module and a positioning module; and
- a controller including a processor and memory, the processor operable to perform instructions stored in the memory to
  - define an offline perimeter surrounding the mobile apparatus, wherein the offline perimeter is defined when the mobile apparatus is disconnected from the central location,
  - locate a position of the mobile apparatus in relation to the offline perimeter,
  - determine whether the position is outside the offline perimeter, and upon the determination,
  - communicate with the network communications module via the mobile communications module and define an online perimeter around the mobile apparatus to enable tracking of the mobile apparatus relative to the online perimeter, the online perimeter having a larger area than the offline perimeter,
  - receive an indication from the central location that the mobile apparatus is located outside the online perimeter, and
  - transmit a signal upon receiving the indication, wherein the signal is an indication of a location of the mobile apparatus outside of the online perimeter.

13. The system of claim 12, wherein the offline perimeter is defined by a mathematical function.

14. The system of claim 12, wherein the online perimeter is defined by one of a global positioning system, a cellular network, and a radio communication network.

15. The system of claim 12, wherein the signal is a notification that the mobile apparatus is located outside the online perimeter.

16. The system of claim 12, wherein the signal deactivates the mobile apparatus.

* * * * *